(12) United States Patent
Wang et al.

(10) Patent No.: US 11,290,471 B2
(45) Date of Patent: Mar. 29, 2022

(54) CROSS-ATTESTATION OF ELECTRONIC DEVICES

(71) Applicant: HEWLETT PACKARD ENTERPRISE DEVELOPMENT LP, Houston, TX (US)

(72) Inventors: Yongqi Wang, Bristol (GB); Ludovic Emmanuel Paul Noel Jacquin, Bristol (GB); Nigel Edwards, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 165 days.

(21) Appl. No.: 16/552,357

(22) Filed: Aug. 27, 2019

(65) Prior Publication Data

US 2021/0067520 A1 Mar. 4, 2021

(51) Int. Cl.
*H04L 29/06* (2006.01)
*G06F 21/56* (2013.01)
*G06F 21/57* (2013.01)

(52) U.S. Cl.
CPC ........ *H04L 63/1416* (2013.01); *G06F 21/564* (2013.01); *G06F 21/57* (2013.01); *H04L 63/145* (2013.01); *H04L 63/168* (2013.01)

(58) Field of Classification Search
CPC ... H04L 63/1416; H04L 63/16; H04L 63/168; H04L 63/145; G06F 21/57; G06F 21/564
See application file for complete search history.

(56) References Cited

U.S. PATENT DOCUMENTS

| 7,587,607 B2 | 9/2009 | Brickell et al. |
| 9,380,024 B2 | 6/2016 | Schmidt et al. |
| 2006/0233116 A1 * | 10/2006 | Kyusojin .............. H04L 69/161 370/252 |

(Continued)

FOREIGN PATENT DOCUMENTS

| EP | 2940618 A1 * | 11/2015 | ............. H04L 63/18 |
| WO | WO-2012050421 A * | 4/2012 | ............. G06F 21/57 |

OTHER PUBLICATIONS

Paul D. Rowe, "Principles of Layered Attestation," Mar. 3, 2016, pp. 1-30, The MITRE Corporation.

(Continued)

*Primary Examiner* — Ali S Abyaneh
(74) *Attorney, Agent, or Firm* — Trop, Pruner & Hu, P.C.

(57) ABSTRACT

A method includes providing, by a first electronic device, a first request to a second electronic device for the second electronic device to provide data to the first electronic device representing content that is stored in a security component of the second electronic device. The first electronic device receives the response from the second electronic device to the first request and, in response thereto, the first electronic device stores data in the first electronic device representing content that is stored in a security component of the second electronic device. The method includes performing cross-attestation. Performing the cross-attestation includes, in response to an attestation request that is provided by a verifier to the first electronic device, the first electronic device providing to the verifier data representing content that is stored in the security component of the first electronic device and data representing the content stored in the security component of the second electronic device.

12 Claims, 7 Drawing Sheets

(56) References Cited

U.S. PATENT DOCUMENTS

| | | | |
|---|---|---|---|
| 2007/0192589 A1* | 8/2007 | Lee | H04L 9/3236 |
| | | | 713/156 |
| 2008/0155277 A1 | 6/2008 | Bulusu et al. | |
| 2011/0202992 A1* | 8/2011 | Xiao | H04L 9/3263 |
| | | | 726/10 |
| 2012/0084850 A1* | 4/2012 | Novak | G06F 21/575 |
| | | | 726/8 |
| 2017/0093800 A1* | 3/2017 | Wiseman | H04L 63/126 |
| 2017/0126647 A1* | 5/2017 | Zhang | H04L 63/08 |
| 2017/0286239 A1* | 10/2017 | Baptist | G06F 3/0659 |
| 2017/0288876 A1 | 10/2017 | Dragone et al. | |
| 2017/0308706 A1* | 10/2017 | Ray | G06F 9/4416 |
| 2018/0241560 A1* | 8/2018 | Chen | H04L 9/3247 |

OTHER PUBLICATIONS

TCG; "Trusted Platform Module Library, Part 3: Commands"; Family "2.0", Level 00 Revision 01.38; Sep. 29, 2016; 455 pp.
TCG, "Trusted Platform Module Library, Part 1: Architecture", Family "2.0", Level 00 Revision 01.38, Sep. 29, 2016, 284 pages.

* cited by examiner

CROSS-ATTESTATION OF ELECTRONIC DEVICES

GOVERNMENT FUNDING

The project leading to this application has received funding from the European Union's Horizon 2020 research and innovation programme under grant agreement No 700199.

BACKGROUND

A computer system may be subject to a security attack in which an external entity seeks to access information that is stored on the computer system or harm components of the computer system. To prevent or at least inhibit such security attacks, the computer system may have various mechanisms to limit access, such as firewalls, passwords, keys, and so forth. Moreover, the computer system may have mechanisms to recognize security threats and automatically take actions to mitigate the effects of the security attacks, such as anti-spyware, screening software, anti-virus software, and so forth. Larger organizations may have a security information and event management (SIEM) system to correlate system events to aid human security analysts in identifying security incidents, monitor security threats, identify suspicious activity for further investigation by human security analysts, monitor security threats and coordinate responses to security incidents.

DETAILED DESCRIPTION

Figure 1:
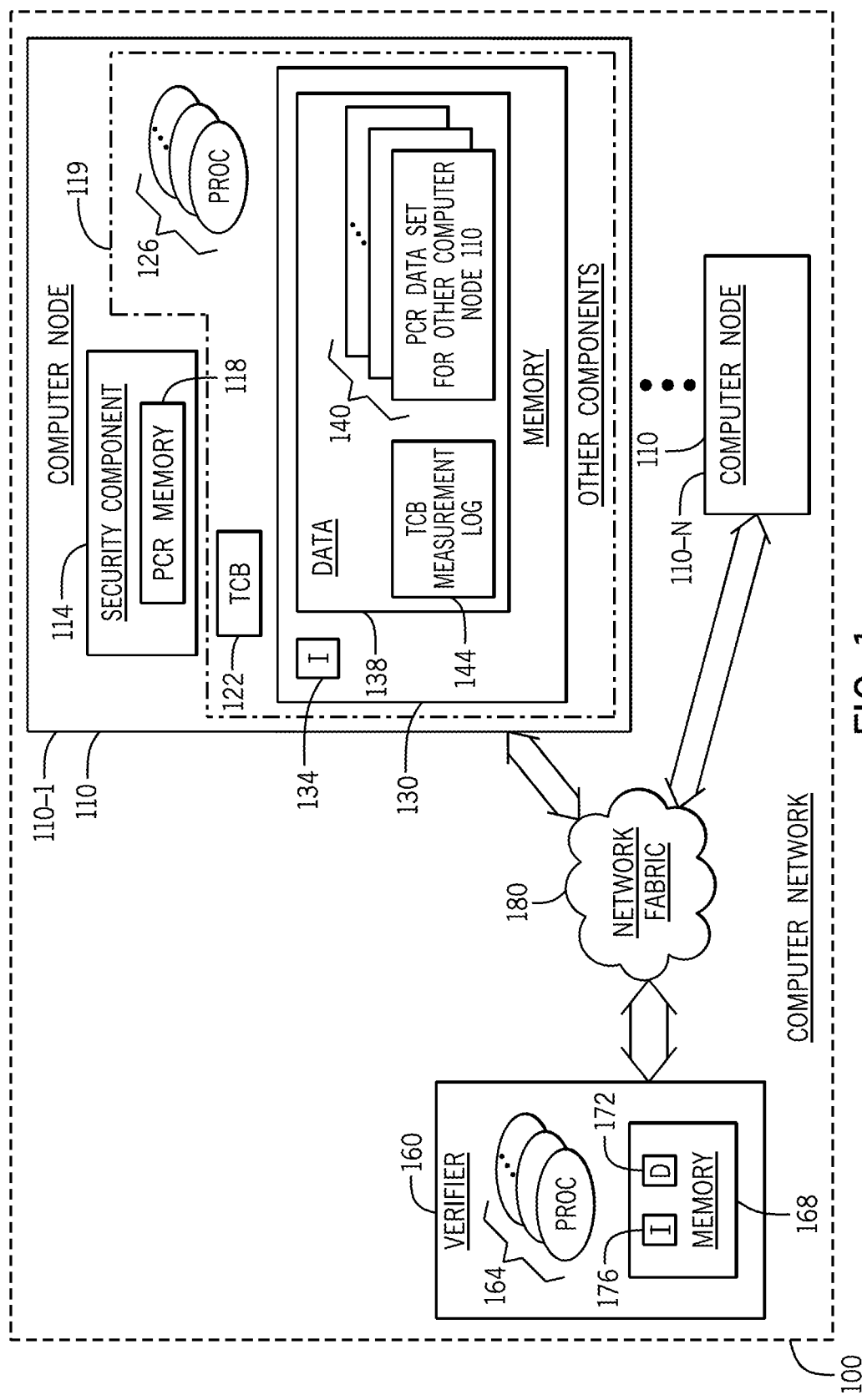
FIG. 1 is a schematic diagram of a computer network that uses cross-attestation according to an example implementation.

Attestation, in general, refers to a process by which one electronic device, called a "verifier", challenges another electronic device, such as a computer platform, to check whether the platform is trustworthy. The attestation relies on measurements of the platform. More specifically, before the platform is challenged by the verifier, the platform performs measurements of itself, relying on a trusted computing base of the platform. These measurements form a log of measurements that are stored by the platform in a platform memory. In this context, a "trusted computing base" refers to a set of hardware, firmware and/or software components of the platform, which form the core of security for the platform. In other words, the trusted computing base may be inherently trusted software, hardware, or some combination thereof. After the platform performs the trusted computing base measurements, the platform may securely store cryptographic hashes of its measurements in a secure memory of the platform, such as platform configuration registers (PCRs) inside a security component (e.g., a security co-processor or a trusted platform module (TPM)) of the platform. The platform may perform the measurements at particular power state of the platform such as, for example, when the platform boots up.

The verifier initiates the challenge of the platform by providing an attestation request to the platform, and a security component of the platform responds to the attestation request with an authenticated digest of the measurement hashes. In this context, an "authenticated digest" refers to a set of measurements of the platform, which are signed by a security component of the platform. A TPM quote (also called a "PCR quote" herein), containing PCR values, is an example of an authenticated digest, although the authenticated digest may take on other forms, in accordance with further example implementations.

In accordance with example implementations, the attestation request contains a nonce, which is a one-time number that is used for identification purposes so that the corresponding authenticated digest may be associated with the request and not be a replayed version of a previous authenticated digest. In this manner, in accordance with example implementations, the authenticated digest that is provided by the secure component of the platform contains the nonce from the attestation request (to verify that the authenticated digest was generated after the attestation request containing the nonce) and the measurement hashes (e.g., the platform's PCR content). Moreover, the secure component of the platform digitally signs the authenticated digest so that a corresponding digital signature is provided with the authenticated digest. The platform may also respond to the attestation request with the log of measurements, which the verifier may validate using the measurement hashes.

The above-described attestation process may allow the verifier to determine whether tampering has occurred with a platform. For example, if tampering has occurred, this tampering may be detectable by the verifier due to the PCR content being reset (due to a resetting of the platform) or due to the measurement hash values not corresponding to the log of measurements.

For a network that contains multiple platforms, a verifier may be able to determine on a platform-by-platform basis whether tampering has occurred with the platforms. In this manner, a verifier for a given computer network may submit attestation requests individually to each of the platforms of the network, with each of these platforms having its own security component and providing a corresponding authenticated digest. Such an approach may, however, provide incomplete information for a network that has been subject to a security attack. For example, there may be a security attack on the network, which is carried out between successive attestations. If this security attack does not disable any of the security components or reset the PCR content of the co-processors, then the above-described attestation approach works as intended, as each platform responds to the attestation request with an authenticated digest, which contains its measurement hashes. However, if a security attack on the network disables a particular security component of a platform or resets stored measurement hashes of a platform, then the trusted record for the corresponding part of the network may be lost.

It is noted that an attacker may reset a computer platform's stored measurement hashes by simply rebooting the platform. This leaves the verifier with an unexplained reboot of the platform but without the means of verifying the platform's measurement log. Other security attacks may involve an attacker wiping signing keys stored by the platform's security component or even physically altering or destroying the security component. When only a single security component is in play, then attestation under this level of attack is unattainable by definition.

In accordance with example implementations that are described herein, the above-described attestation process is extended to include cross-attestation among the platforms for purposes of providing additional information that allows a verifier to assess the condition of the network. As further described herein, the cross-attestation allows the security components of the platforms to collaborate to share measurement hashes and store the hashes in a way that provides attestation information to the verifier about portions of the network that may have been subject to a security attack. Moreover, due to the cross-attestation that is described herein, the verifier may acquire attestation information about a given platform that has been subject to a security attack, using a mechanism that does not involve the verifier directly challenging this given platform (which may be unavailable due to the security attack).

More specifically, in accordance with example implementations, PCR contents for corresponding platforms of a computer network are distributed among the computer platforms, and this distributed PCR content information forms a history, which the verifier may use to evaluate the condition of the network. Using two platforms as an example of the cross-attestation, a first platform may submit a request to a second platform for the second platform to provide an authenticated digest of its PCR contents to the first platform. The second platform provides the requested authenticated digest to the first platform, and the first platform stores the corresponding PCR content in a memory of the first platform. The first platform may also submit other requests for authenticated digests to other platforms of the network and store the PCR contents of these other platforms in the first platform's memory. A verifier may provide an attestation request to the first platform, and the first platform may, in response to the attestation request, provide not only an authenticated digest for the PCR content of the first platform but also provide the PCR contents of other platforms to the verifier.

In a similar manner, the PCR content may be distributed among other platforms of the network and may be provided a similar manner to the verifier in response to platform attestation request. Even if a security attack has disabled parts of the network (or at least rendered the parts untrustworthy), the verifier may use the distributed and stored PCR content to determine valuable information about the attack, such as identifying parts of the network affected by the security attack, determining the mechanisms by which the security attack propagated across the network, determining times at which different platforms were affected by the security attack, and so forth.

As a more specific example, FIG. 1 depicts a computer network 100 in accordance with some implementations. In general, the computer network 100 includes multiple computer platforms, called "computer nodes 110." In general, the computer node is an example of an "electronic device." In this context, an "electronic device" refers to an electronic component-based unit, which is capable of responding to an attestation challenge by providing an authenticated digest. The electronic device may take on many different forms in accordance with different implementations, such as portable electronic devices, non-portable electronic devices, processor-based electronic devices, cellular devices, smart telephones, wearable electronic devices, laptop computers, tablet computers, desktop computers, network components, servers, clients, and so forth.

For the example implementation that is depicted in FIG. 1, there are N computer nodes 110, including a specific computer node 110-1. It is assumed herein that, in accordance with example implementations, the other computer nodes 110 have a general architecture similar to the computer node 110-1.

As depicted in FIG. 1, the computer node 110-1 includes a security component 114 (e.g., a security co-processor or a TPM). The security component 114, in general, forms a Root of Trust for storing and a Root of Trust for reporting for the computer node 110. In addition to the security component 114, the computer node 110 includes hardware and software components 119 (called the "other components" 119 herein, including components that form a trusted computing base (TCB) 122 of the computer node 110-1). These other components 119 may include, for example, one or multiple processors 126 (one or multiple central processing units (CPUs), one or multiple CPU processing cores, and so forth) and a memory 130, as further described herein. In general, in accordance with example implementations, the TCB 122 is a Root of Trust for measuring for the computer node 110. Although the TCB 122 is depicted in FIG. 1 as being separate from the remaining components 119, it is noted that, depending on the particular implementation, the TCB 122 may include one or more of these components.

In accordance with example implementations, the TCB 122 and the security component 114 are part of a "Root of Trust device" for the computer node 110. As used herein, a "Root of Trust device" or RoT device, may be a device that behaves in an expected manner, as the RoT device's misbehavior may not be detectable. In other words, the RoT device may be inherently trusted software, hardware, or some combination thereof. A RoT device may include compute engines. The compute engine may be software operating using hardware in the RoT device, hardware of the RoT device, or some combination thereof. For example, a RoT device may include a Root of Trust for Storage (RTS). The RTS may be a compute engine capable of maintain an accurate summary of values.

For example implementations that are described herein, the security component 114 is a Root of Trust for storing a log of measurements for the computer node 110-1. More specifically, in accordance with example implementations, as part of the Root of Trust for storing, the security component 114 has a memory, such as a platform configuration register (PCR) memory 118, which stores data that represents the hash values of measurements of the TCB 122. As an example, the computer node 110-1 may take a log of measurements of the TCB 122 at boot up of the node 110-1 and store values of hashes of these measurements in the PCR memory 118.

The security component 114 may also serve as a Root of Trust for Reporting (RTR) for the computer node 110-1. The RTR may be a compute engine that is capable of sending authenticated information to a requesting device. The information may include the contents in a memory of the RoT, such as the PCR memory 118. The RoT may include other compute engines not described here, such as a compute engine to measure specified values or a compute engine to authenticate.

In accordance with example implementations, the security component 114 may be in the form of a chip that resides on the computer node 110-1 (separate from processors 126 of the computer node 110) and may be used to store encryption keys, such as passwords, certificates, public keys, private keys, etc., for hardware authentication. The security component 114 may be a crypto-processor (microprocessor) that is designed according to industry standards to provide hardware-based, security functions while also resisting tampering and malicious software. Example security components that may be used include, for example, trusted platform modules (TPMs and/or TPM kits), or other firmware with the capabilities described herein. Examples of TPMs that may be used are commercially available from INFINEON TECHNOLOGIES® and NUVOTON®. Other examples of security components include a firmware-based security co-processor, such as a TPM implemented in ARM TRUSTZONE® commercially available from ARM LIMITED® out of Cambridge, UK or INTEL® SGX commercially available from INTEL® out of Santa Clara, Calif., which can part of a main processor for the computer node 110-1.

In accordance with example implementations, the security component 114 may be an integrated circuit that is built into a motherboard of the computer node 110-1. The security component 114 is tamper resistant or tamper proof, in accordance with example implementations. Moreover, the security component 114 may be utilized to provide security-related services on the computer node 110, such as identification services, authentication services, encryption services, measurement services, device integrity determination services, and secure storage services.

The PCR memory 118 may store security relevant metrics. Machine-readable instructions (such as a kernel) or devices may extend the PCR memory content with data. To extend the PCR content with a measurement, the machine-readable instructions or device extending the PCR content may send a new value to the security component 114. The security component 114 may take a hash of the new value and the current value in the PCR, and the security component 114 may store the result in the PCR memory 118.

The TCB 122, in accordance with example implementations, is a combination of hardware and software used to take measurements of and to define security for the computer node 110. In accordance with example implementations, the TCB 122 may include a security kernel that is used to detect changes in the computer node 110-1 that may indicate a security threat. The TCB 122 may also, depending on the particular implementations, restrict access, safeguard against malware and backing up data. As an example implementation, the TCB 122 may include a commercially available processor (one of the processors 126, for example), such as an INTEL®, AMD® or other processor, in combination with a commercially available operating system, such as LINUX® or MICROSOFT® WINDOWS®.

As used herein, a "hash" or "hash value" is produced by the application of a cryptographic hash function to a value (such as a particular trust measurement). As used herein, a "cryptographic hash function" may be a function comprising machine-readable instructions. The cryptographic hash function may include machine-readable instructions that, when executed by a processor, may receive an input. The cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string.

In general, the memory 130 represents volatile and/or non-volatile memory of the computer node 110-1. In general, the memory 130 is a non-transitory storage medium that may be formed from semiconductor storage devices, memristors, phase change memory devices, a combination of storage devices selected from one or more of these storage technologies, and so forth. In general, the memory 130 may store machine executable instructions 134 (or "software"), which are executed by one or multiple processors 126 for purposes of causing the processor(s) 126 to perform one or multiple functions pertaining to the cross-attestation that is described herein. As described further herein, these functions may include such functions as providing PCR requests to other computer nodes 110; generating nonces for the PCR requests to other computer nodes 110; providing the nonces to the security component 114 for purposes of having the security component 114 generate a time stamp (i.e., a time indicator, such as a sampled clock or sampled counter) for the nonce and generate a digital signature for the time stamp and nonce; receiving PCR quotes from other computer nodes 110; checking signatures and nonces of the PCR quotes from the other computer nodes 110; and so forth. In accordance with further example implementations, one or more of these functions may be controlled in whole or in part by specific hardware that does not execute machine executable instructions, such as an application specific integrated circuit (ASIC), a field programmable gate array (FPGA), and so forth.

As depicted in FIG. 1, the memory 130 further stores data 138. As described herein, this data may include a TCB measurement log 144, which contains measurements of the TCB 122; and the data 138 may include PCR data sets 140, i.e., sets of data corresponding to other computer nodes 110 and containing the PCR memory contents for these nodes 110.

As depicted in FIG. 1, the computer nodes 110 may communicate with each other and communicate with a verifier 160 of the computer network 100 using network fabric 180. In general, the network fabric 180 may include components and use protocols that are associated with one or multiple types of communication networks, such as (as examples) Fibre Channel networks, iSCSI networks, ATA over Ethernet (AoE) networks, HyperSCSI networks, local area networks (LANs), wide area networks (WANs), global networks (e.g., the Internet), wireless networks, or any combination thereof.

In accordance with some implementations, the verifier 160 may also be a computer node (i.e., a "computer platform" or "electronic device"), which includes such resources, such as one or multiple processors 164 and a memory 168. The processor 164 may, for example, represent one or multiple CPUs, CPU processing cores, and so forth.

Moreover, the memory 168 may be formed from one or multiple non-transitory-types storage devices, similar to the memory 130. Moreover, as depicted in FIG. 1, the memory 168 may store machine executable instructions 176 that, when executed by one or multiple processors 164, cause the processor(s) 164 to perform one or more functions of the verifier 160, as further described herein. Moreover, the memory 168 may store data 172, such as, for example, data representing quotes received from the computer nodes 110, PCR values, and so forth. Moreover, in accordance with some implementations, one or more functions of the verifier 160 may be performed from dedicated hardware that does not execute machine executable instructions, such as, for example, an ASIC, an FPGA, and so forth.

In accordance with example implementations, cross-attestation is performed on the computer network 100 as follows. It is noted that for the following description, the security components of the computer nodes 110, in response to attestation challenges, or requests, provide authenticated digests in the form of PCR quotes (or "TPM quotes"). However, in accordance with further example implementations for non-TPM-based security components, the computer nodes 110 may provide authenticated digests other than PCR quotes. The verifier 160 regularly submits (or at least attempts to submit) attestation requests to each of the computer nodes 110 (assuming here, that the verifier 160 considers the nodes 110 to be available); and the computer nodes 110 respond to the attestation requests with quotes of their respective PCR values and measurement logs.

The computer nodes 110 also share the PCR data sets 140, which were acquired using PCR requests and corresponding PCR quotes communicated among the computer nodes 110. Using a pair of computer nodes 110 as an example, a first computer node 110 may submit a PCR request to a second computer node 110, and the second computer node 110 may respond with a quote of its PCR content. In accordance with example implementations, when the first computer node 110 receives a quote containing the PCR values from the second computer node 110, the first computer node 110 performs some checks, if possible, to validate the PCR values. After validation, the first computer node 110 generates a corresponding PCR value data set 140 for the second computer node 110, which the first computer node 110 stores in the memory 130. In accordance with example implementations, the data set 140 includes a time stamp (generated by the security component 114); the PCR quote returned by the second computer node 110 (including the nonce of the request and the PCR content); the PCR content of the second computer node 110; and the security component's digital signature of these items (i.e., a signature of the time stamp, PCR quote and PCR content).

The first computer node 110 may request PCR values from one or multiple other computer nodes 110, and the first computer node 110 may generate and store corresponding data sets 140 for the other computer nodes 110 in a similar manner. Other computer nodes 110 of the network 100 may request PCR values from one or multiple other computer nodes 110, and generate and store corresponding data sets 140 in a similar manner. Moreover, the collection of PCR data sets 140 stored on the computer nodes 110 of the network 100 may be somewhat redundant, in that some computer nodes 110 may store the same corresponding PCR data set for the same computer nodes 110.

When the verifier 160 challenges a given computer node 110, the computer node 110, in accordance with example implementations, responds with a quote of its current PCR values and its measurement log. In addition, the computer node 110, in accordance with example implementations, responds to the attestation request by providing its stored data sets 140 corresponding to the PCR values and quotes from one or multiple other computer nodes 110. Due to the PCR values being distributed among the computer nodes 110, should a particular computer node 110 or the security component of this node 110 become unavailable (e.g., become unavailable due to a security attack), the record of the node's activity before this tampering/disabling activity happens is not lost.

Figure 2:
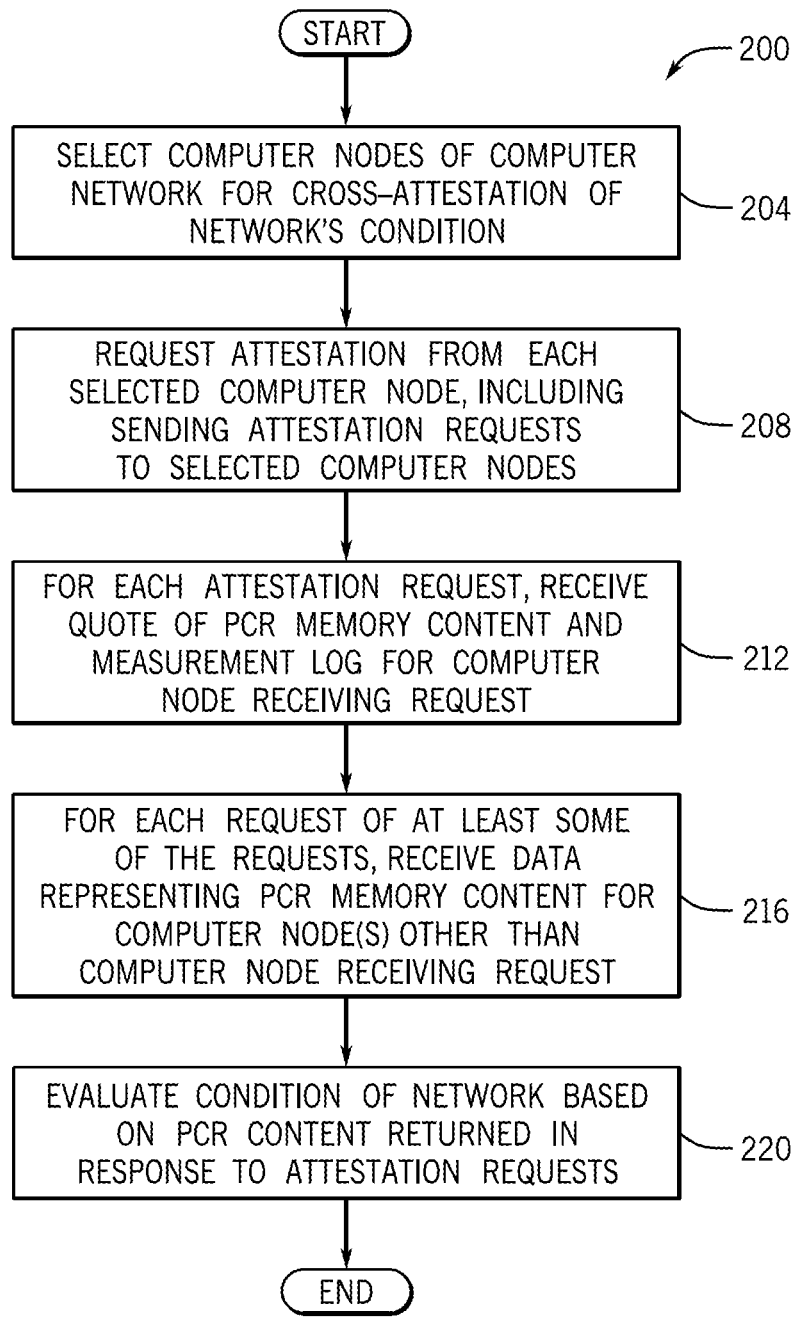
FIG. 2 is a flow diagram depicting a cross-attestation-based technique used by a verifier to assess a condition of a computer network according to an example implementation.

As a more specific example, in accordance with some implementations, the verifier 160 may perform a technique 200 that is depicted in FIG. 2. Referring to FIG. 2 in conjunction with FIG. 1, pursuant to the technique 200, the verifier 160 selects a set of computer nodes 110 of the computer network 100 for cross-attestation of the network's condition. It is noted that in accordance with some implementations, certain subsets of nodes 110 of the network 100 may be selected, in that all of the nodes 110 may not be selected to preserve scaling of the cross-attestation. Pursuant to block 208, the verifier 160 submits an attestation request to each of the selected computer nodes 110. Pursuant to block 212, for each request, the verifier 160 receives a quote from the computer node of the PCR memory content and a measurement log. Moreover, as depicted in block 216, for each attestation request, the verifier 160 receives data representing the PCR memory content for one or multiple other computer nodes 110. The verifier 160 may then evaluate the condition of the network based on the PCR content return in response to the attestation request, pursuant to block 220.

Figure 3:
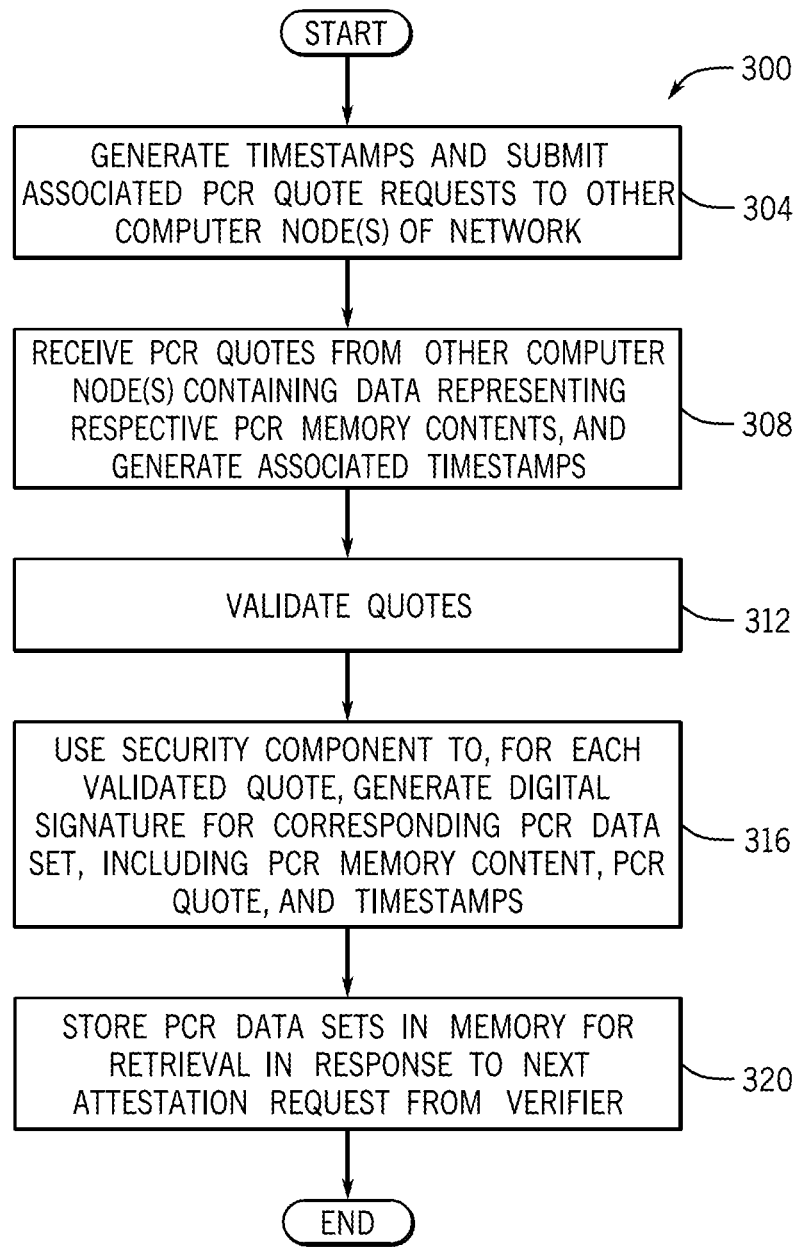
FIG. 3 is a flow diagram depicting a technique used by a computer node to acquire platform configure register (PCR) memory content from other computer nodes and respond to an attestation request from a verifier according to an example implementation.

FIG. 3 depicts actions taken by a particular computer node 110 in accordance with example implementations. Referring to FIG. 3 in conjunction with FIG. 1, pursuant to the technique 300, the computer node 110 generates timestamps and submits the associated PCR quote requests to one or multiple other nodes 110 of the network 100, as depicted in block 304. Moreover, the particular computer node 110 receives (block 308) PCR quotes from the other computer node(s) 110 containing data representing respective PCR memory contents and generates the associated timestamps. The computer node 110 then validates (block 312) the quotes (e.g., based on the signature with the quotes and the nonces contained in the quotes). The computer node 110, then, pursuant to block 316, uses the security component 114 to, for each validated quote, generate a digital signature for the corresponding PCR data set, which includes the PCR memory content, the received PCR quote(s) and the associated timestamps. The computer node 110 then, pursuant to block 320, stores the PCR data sets in memory for retrieval in response to the next attestation request from the verifier, pursuant to block 320.

In accordance with example implementations, the verifier 160 may validate a given PCR data set 140 based on time stamps that are associated with the data set 140. In this manner, when the computer node 110 is to send out a PCR request, the computer node 110 may generate a nonce and send the nonce to the node's security component 114. In response to the nonce, the security component 114 generates a time stamp for the PCR request and generates a digital signature for the nonce and time stamp. The PCR request therefore includes a time stamp marking the time at which the PCR request was sent to the other computer node. When the corresponding PCR quote is received by the requesting computer node, the security component 114 generates another time stamp and generates a digital signature for the received PCR values, quote and time stamp. This way, there is a record of how much time passes between a given PCR request and the recording of the resulting PCR values received in the corresponding quote. This may be useful if the verifier 160 implements its own policy of acceptance or denial of PCR values, depending on the time that has elapsed between a particular PCR request and the recording of the corresponding PCR values, instead of relying on each computer node's policy pertaining to the validation of the PCR values.

Figure 4:
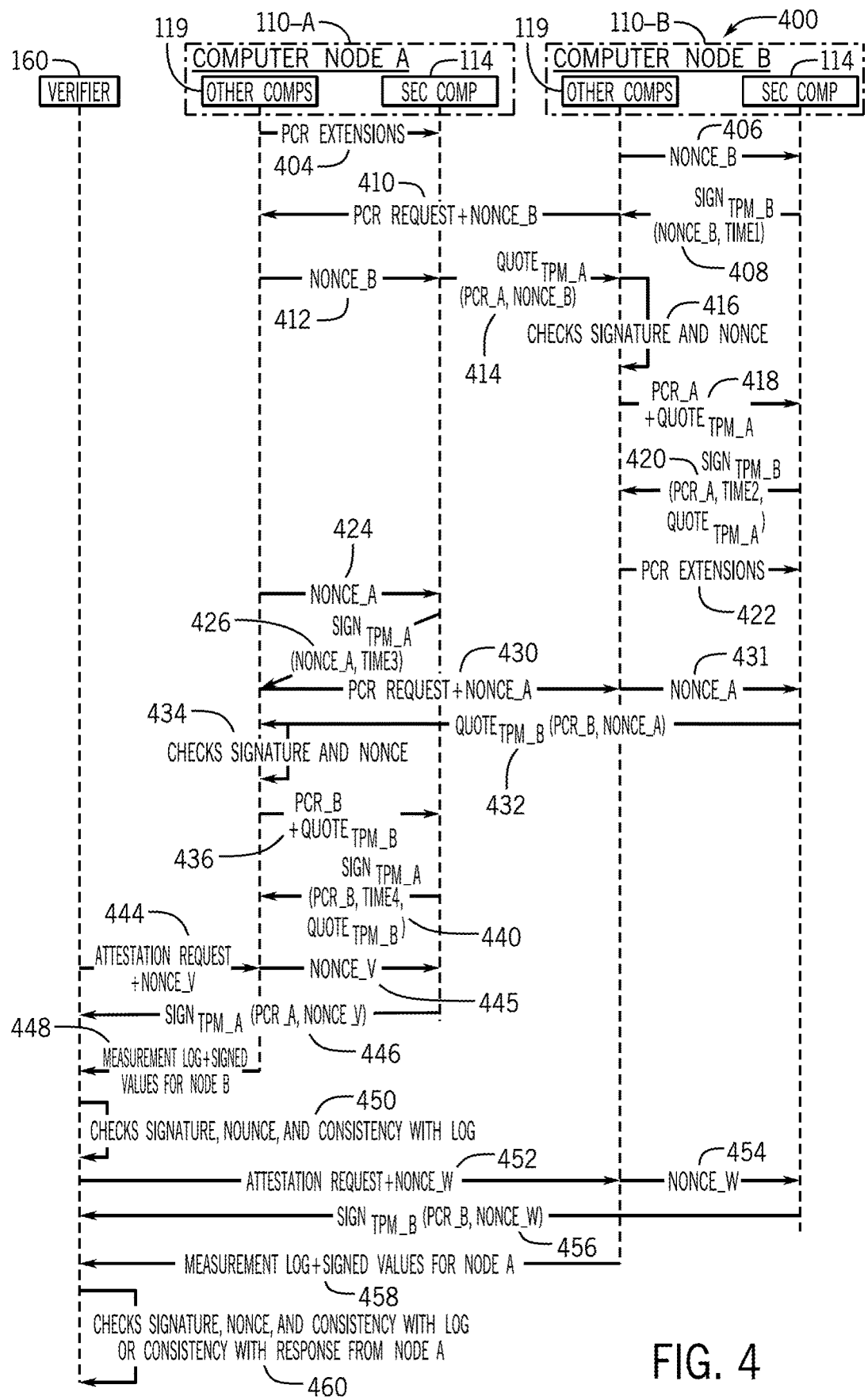
FIG. 4 is an example communication flow among a verifier and computer nodes of the computer network illustrating cross-attestation according to an example implementation.

FIG. 4 depicts an example communication flow illustrating the cross-attestation, in accordance with some implementations. The example communication flow involves the verifier 160, computer node 110-A and computer node 110-B. The computer node 110-A contains a security component 114 and other components 119; and likewise, the computer node 110-B contains a security component 114 and other components 119.

As depicted at reference numeral 404, the computer node 110-A may perform Root of Trust measurements and store corresponding PCR extensions (i.e., hashes of the measurements) in its security component 114. Moreover, the computer node 110-B may also perform Root of Trust measurements and store corresponding PCR extensions in its security component 114, as depicted at reference numeral 422.

The computer node 110-B may request PCR values from the computer node 110-A using the following process. First, the computer node 110-B generates a nonce (called "NONCE_B" in FIG. 4), as depicted at reference numeral 406, and provides the nonce to its security component 114. As depicted at reference numeral 408, the security component 114 generates a time stamp (called "TIME1" in FIG. 4) and generates a digital signature based on the NONCE_B nonce and the TIME1 timestamp. The digital signature, NONCE_B nonce and the TIME1 timestamp form part of a PCR request 410, which the computer node 110-B sends to the computer node 110-A. It is noted, for purposes of simplifying FIG. 4, the security component 114 of the computer node 110-B is graphically depicted in FIG. 4 as sending the PCR request and NONCE_B nonce to the computer node 110-A. However, the security component 114 of the computer node 110-B does not, in accordance with example implementations, communicate directly with another computer node 110, such as computer node 110-A. For example, the security component 114 of the computer node 110-B may rely on one or multiple other components of the computer node 110-B (e.g., the operating system (OS), a management network interface, and so forth) to communicate the PCR request and NONCE_B nonce to the computer node 110-A. In a similar manner, although for purposes of simplifying FIG. 4, this figure depicts the security component 114 of the computer node 110-A communicating directly with the computer node 110-B, this communication occurs, in accordance with example implementations, using one or multiple components of the computer node 110-A.

In response to the PCR request 410, the computer node 110-A provides the NONCE_B nonce to its security component 114, as depicted at reference numeral 412, which prompts the security component 114 to provide a PCR quote, as depicted at reference numeral 414. In accordance with some implementations, the PCR quote is signed by the security component 114 (i.e., contains a digital signature by the security component 114), includes the PCR values stored in the security component 114 and includes the PCR values stored in the security component 114 and the NONCE_B nonce. As depicted at reference numeral 416, the computer node 110-B checks the signature of the PCR quote and the NONCE_B nonce to validate the PCT quote; and once validated, the computer node 110-B provides the PCR values from the computer node 110-A, and the PCR quote to its security component 114, as depicted at reference numeral 418. In accordance with example implementations, the security component 114 of the computer node 110-B may then generate a time stamp (called "TIME2" in FIG. 4) and generate a digital signature based on the TIME2 time stamp, PCR values and PCR quotes received from the computer node 110-A, as depicted at reference numeral 420.

FIG. 4 also depicts the computer node 110-A requesting PCR values from the computer node 110-B. In this manner, as depicted at reference numeral 424, the computer node 110-A generates a nonce (called "NONCE_A" in FIG. 4), as depicted at reference numeral 424, and provides the NONCE_A nonce to the security component 114 of the computer node 110-A. The security component 114 of the computer node 110-A generates a digital signature based on the NONCE_A nonce and based on a time stamp (called "TIME3" in FIG. 2) that is generated by the security component 114. As depicted at reference numeral 430, the computer node 110-A then provides a PCR request (as depicted at reference numeral 430) to the computer node 110-B. As depicted at reference numeral 431, the computer node 110-B provides the NONCE_A nonce to its security component 114, which then provides a quote 432 of the PCR values for the computer node 110-B to the computer node 110-A, as depicted at reference numeral 432. The computer node 110-A then checks the signature and the nonce, as depicted at reference numeral 434; provides the PCR values from the computer node 110-B and the PCR quote from the computer node 110-B to its security component 114, as depicted at reference numeral 436. The security component 114 of the computer node 110-A then generates a time stamp (called "TIME4" in FIG. 4) and generates a corresponding digital signature, as depicted at reference numeral 440.

Thus, due to the cross-attestation described herein, at reference numeral 440 in FIG. 4, at this point, the computer node 110-A stores PCR values for the computer node 110-B; and the computer node 110-B stores PCR values for the computer node 110-A.

Beginning at reference numeral 444, FIG. 4 depicts attestation requests to the computer nodes 110-A and 110-B. In this manner, as depicted at reference numeral 444, the verifier 160 may provide an attestation request to the computer node 110-A, which causes the computer node 110-A to provide a nonce (called "NONCE_V" in FIG. 4) associated with the request to the security component 114 of the node 110-A, as depicted at reference numeral 445. In response to the attestation request, the security component 114 of the computer node 110-A provides a signed quote of its PCR values to the verifier 160, as depicted at reference numeral 446. Moreover, as depicted at reference numeral 448, the computer node 110-A provides its measurement log and the signed PCR values for the computer node 110-B (i.e., provides the corresponding PCR data set 140). The verifier 160 validates the quote provided by the computer node 110-A and validates the data set 140. In this manner, as depicted at reference numeral 450, the verifier 160 may check the signature, the nonce as well as the consistency between the measurement hashes and the measurement log.

FIG. 4 also, at reference numerals 452 to 460, depicts a communication flow associated with the verifier 160 providing an attestation request to the computer node 110-B, resulting in the computer node 110-B providing a PCR quote as well as its measurement log and the data set 140 for the computer node 110-A. In this manner, the verifier 160 provides (reference numeral 452) an attestation request to the computer node 110-B, which causes the computer node 110-B to provide a nonce (called "NONCE_W" in FIG. 4) associated with the request to the security component 114 of the node 110-B, as depicted at reference numeral 454. In response to the attestation request, the security component 114 of the computer node 110-B provides a signed quote of its PCR values to the verifier 160, as depicted at reference numeral 456. Moreover, as depicted at reference numeral 458, the computer node 110-B provides its measurement log and the signed PCR values for the computer node 110-A (i.e., provides the corresponding PCR data set 140). As depicted at reference numeral 460, the verifier 160 checks the signature, the nonce, and the consistency between the measurement hashes and the measurement log.

Figure 5:
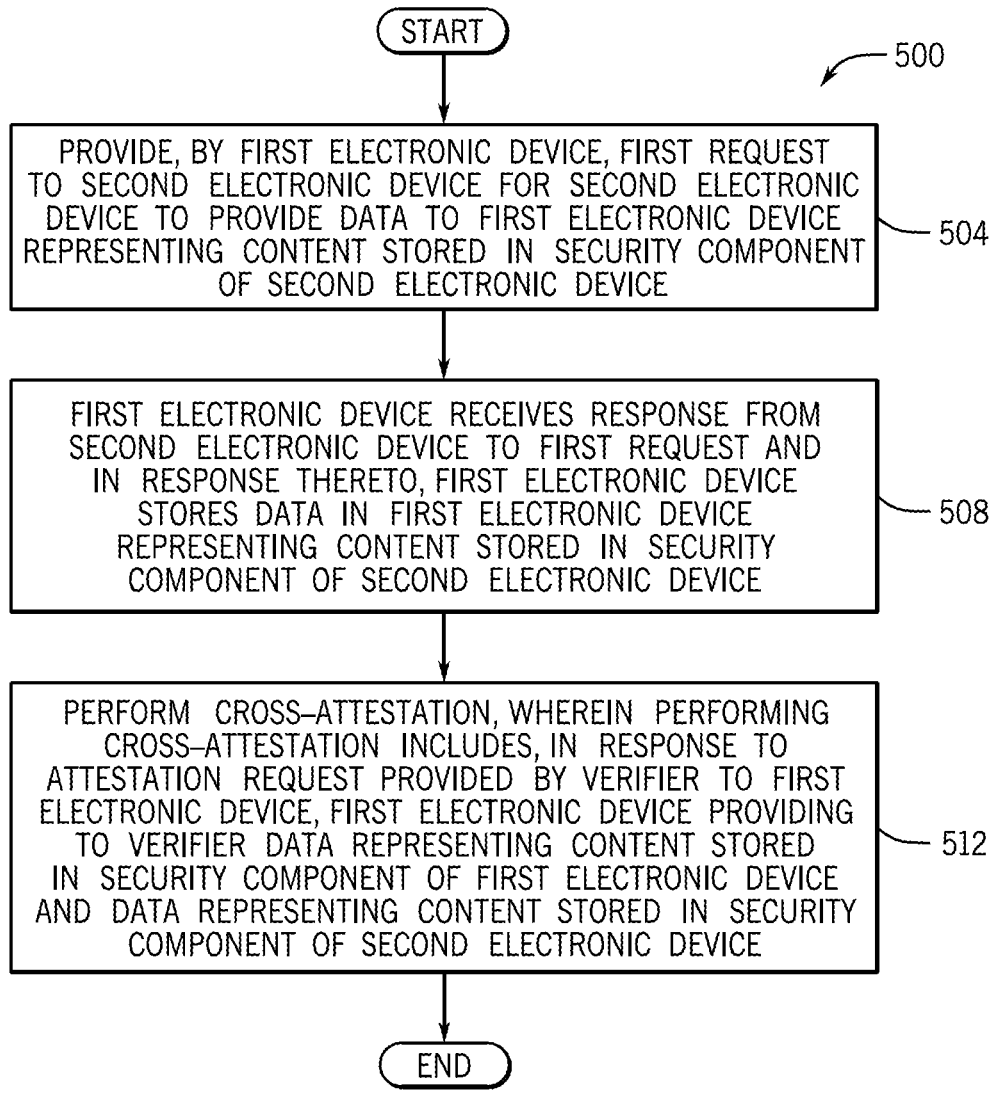
FIG. 5 is a flow diagram representing a cross-attestation technique according to an example implementation.

Thus, referring to FIG. 5, in accordance with example implementations, a technique 500 includes providing (block 504), by a first electronic device, a first request to a second electronic device for the second electronic device to provide data to the first electronic device representing content that is stored in a security component of the second electronic device. Pursuant to block 508, the first electronic device receives the response from the second electronic device to the first request and, in response thereto, the first electronic device stores data in the first electronic device representing content that is stored in a security component of the second electronic device. As depicted in block 512, the technique 550 includes performing cross-attestation. Performing the cross-attestation includes, in response to an attestation request that is provided by a verifier to the first electronic device, the first electronic device providing to the verifier data representing content that is stored in the security component of the first electronic device and data representing the contents stored in the security component of the second electronic device.

Figure 6:
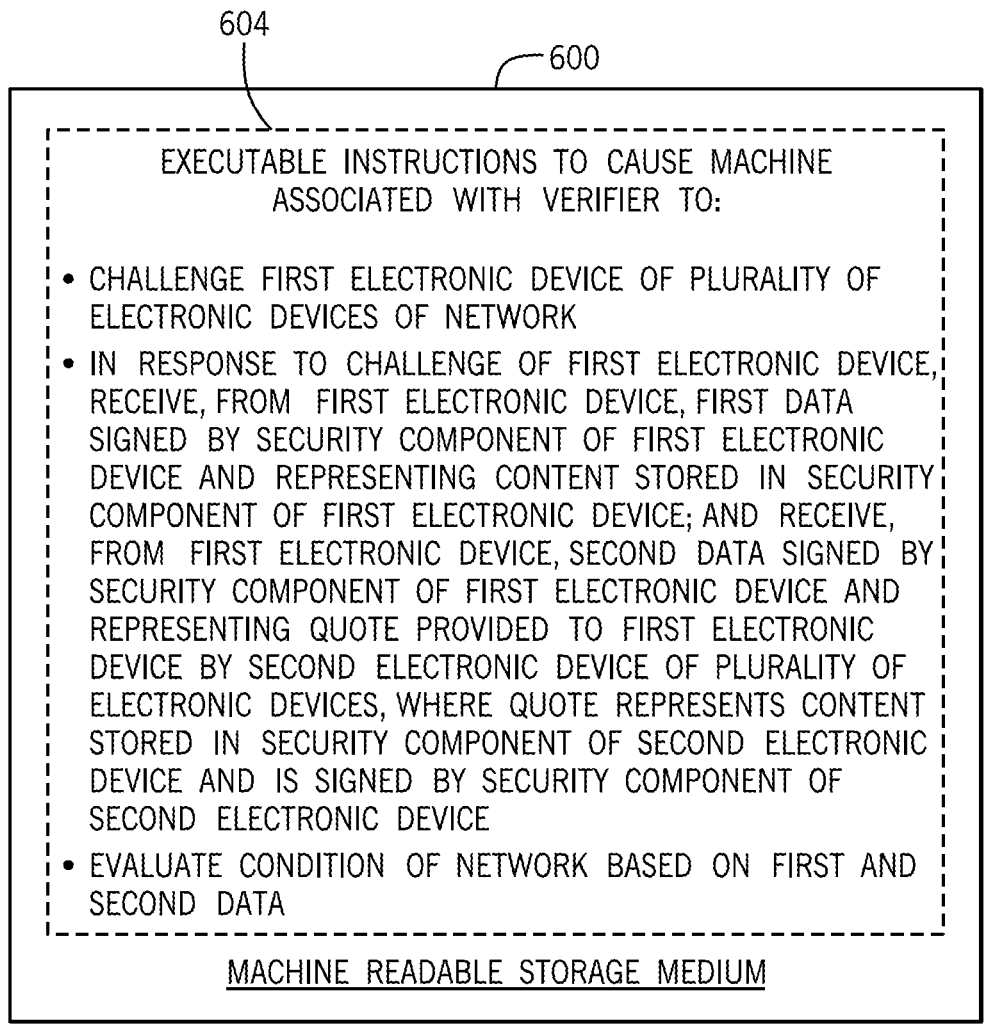
FIG. 6 is an illustration of instructions stored on a non-transitory machine-readable storage medium to cause a machine associated with a verifier to use cross-attestation to evaluate a condition of a network according to an example implementation.

Referring to FIG. 6, in accordance with example implementations, a non-transitory machine-readable storage medium 600 stores instructions 604 that, when executed by a machine that is associated with a verifier, cause the machine to challenge a first electronic device of a plurality of devices of a network; and in response to the challenge of the first electronic device, receive, from the first electronic device first data signed by a security component of the first electronic device and representing content stored in a security component of the first electronic device; and receive, from the first electronic device, second data that is signed by a security component of the first electronic device and represents an authenticated digest provided to the first electronic device by a second electronic device of the plurality of devices. The authenticated digest represents content that is stored in the security component of the second electronic device and is signed by the security component of the second electronic device. The instructions 604, when executed by the machine, further cause the machine to evaluate a condition of the network based on the first and second data.

Figure 7:
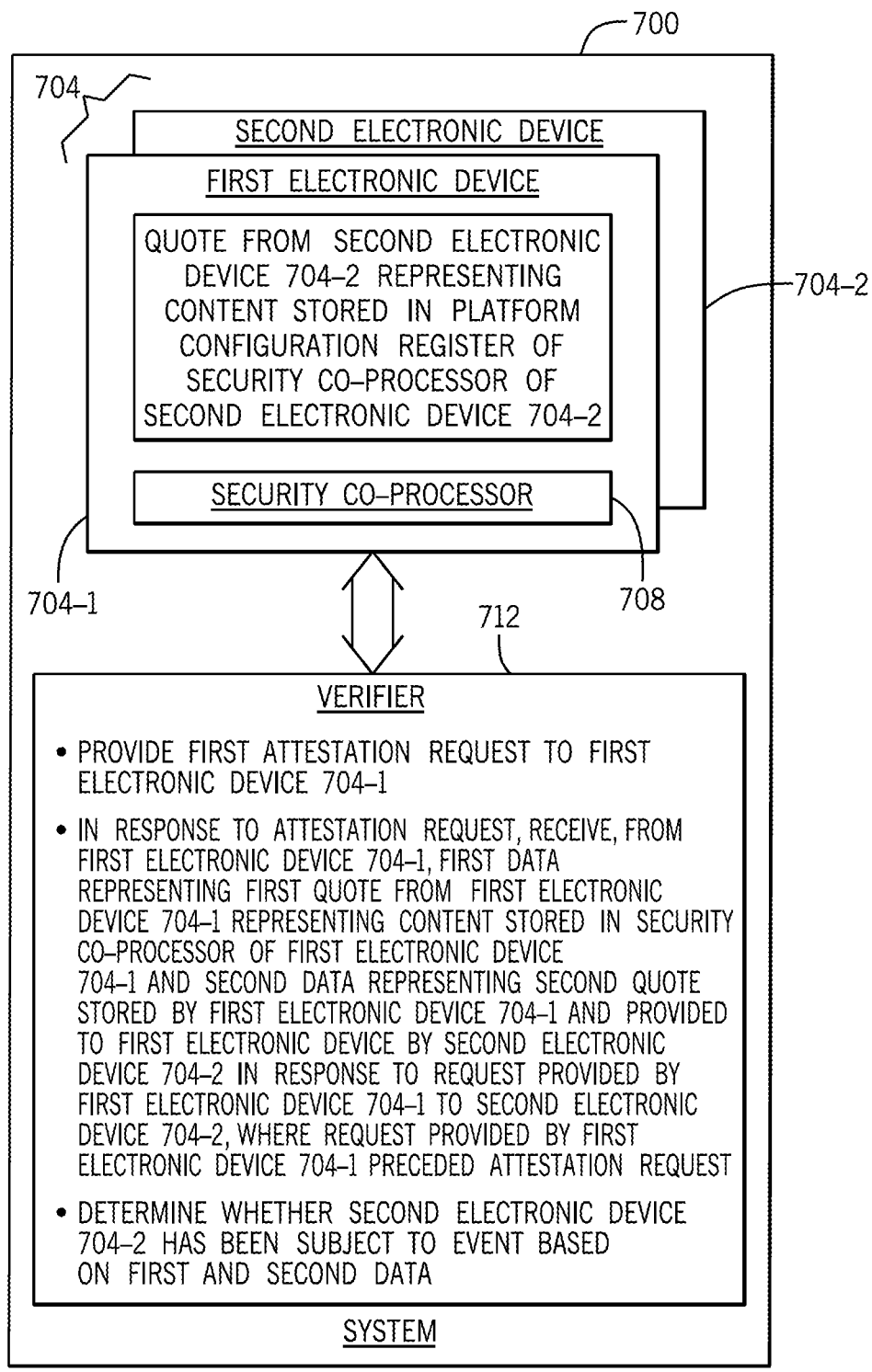
FIG. 7 is a schematic diagram of a system that uses cross-attestation to determine whether a device of a network has been subject to an event according to an example implementation.

Referring to FIG. 7, in accordance with example implementations, a system 700 includes a plurality of devices 704 and a verifier 712. The plurality of devices 704 includes a first electronic device 704-1, which has a security co-processor 708 and a second electronic device 704-2, which has a security co-processor 708. The verifier 712 provides a first attestation request to the first electronic device 704-1; and in response to the first attestation request, receives, from the first electronic device 704-1, first data that represents a first authenticated digest from the first electronic device 704-1 and second data that represents a second authenticated digest stored by the first electronic device 704-1 and provided to the first electronic device 704-1 by the second electronic device 704-2 in response to a second attestation request provided by the first electronic device 704-1 to the second electronic device 704-2. The second attestation request preceded the first attestation request. The verifier 712 determines whether the second electronic device 704-2 has been subject to an event based on the first and second data.

In accordance with example implementations, the first electronic device determines a validity of the received response from the second electronic device based on at least one of a nonce or a signature that is associated with the response. This has the advantage of the devices being able to eliminate invalid data without providing invalid data to the verifier.

In accordance with example implementations, the first electronic device, in response to determining that the response from the second electronic device is valid, uses the security component of the first electronic device to generate a signature for the data stored in the first electronic device. This has the advantage of the devices being able to eliminate invalid data without providing invalid data to the verifier.

In accordance with example implementations, the first electronic device stores the data signed by the first electronic device in a memory of the first electronic device, and the memory is external to the security component of the first electronic device. This has the advantage of allowing memory outside of the security component to store the cross-attestation data.

In accordance with example implementations, the security component of the first electronic device is used to generate a first time stamp associated with the first request and generate a second time stamp that is associated with the reception of the response from the second electronic device. This has the advantage of allowing the verifier to independently validate the data based on the first and second time stamps.

In accordance with example implementations, the first electronic device receives authenticated data from the second electronic device representing a content of a platform configuration register of the second electronic device. This has the particular advantage of allowing measurement hash values to be distributed among the devices pursuant to the cross-attestation.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   providing, by a first electronic device, a first request to a second electronic device for the second electronic device to provide data representing content stored in a security component of the second electronic device to the first electronic device,
   wherein the first electronic device and the second electronic device are devices of a plurality of devices of a network, and the plurality of devices further comprise a third electronic device,
   the first electronic device receiving a response including the data from the second electronic device to the first request and in response thereto, the first electronic device storing the data representing the content stored in the security component of the second electronic device in the first electronic device;

performing cross-attestation, wherein performing the cross-attestation comprises, in response to an attestation request provided by a verifier to the first electronic device, the first electronic device providing to the verifier data representing content stored in a security component of the first electronic device and the data representing the content stored in the security component of the second electronic device, providing, by the first electronic device, a request to the third electronic device for the third electronic device to provide second data representing content stored in a security device of the third electronic device to the first electronic device;

the first electronic device receiving a response data including the second data from the third electronic device and in response thereto, the first electronic device storing the second data representing the content stored in the security device of the third electronic device in the first electronic device; and in response to the attestation request provided by the verifier to the first electronic device, the first electronic device providing to the verifier data representing the content stored in the security device of the third electronic device.

2. The method of claim 1, further comprising:
the first electronic device determining a validity of the received response from the second electronic device based on at least one of a nonce or a signature associated with the response.

3. The method of claim 2, further comprising:
the first electronic device, in response to determining that the response from the second electronic device is valid, uses the security component of the first electronic device to generate a signature for the data stored in the first electronic device.

4. The method of claim 1, further comprising:
the first electronic device storing the data in a memory of the first electronic device, wherein the memory is external to the security component of the first electronic device.

5. The method of claim 1, further comprising:
using the security component of the first electronic device to generate a first time stamp associated with the first request; and
the first electronic device using the security component to generate a second time stamp associated with the reception of the response from the second electronic device.

6. The method of claim 1, wherein the first electronic device receiving a response from the second electronic device to the first request comprises the first electronic device receiving authenticated data from the second electronic device representing a content of a platform configuration register of the second electronic device.

7. The method of claim 1, wherein the first electronic device providing the first request comprises the first electronic device providing a first nonce, and the first electronic device receiving the response from the second electronic device comprises the first electronic device receiving an authenticated digest from the second electronic device, the method further comprising:
the first electronic device checking a nonce contained in the authenticated digest to determine whether the nonce contained in the authenticated digest is the same as the first nonce;
the first electronic device checking a signature of the authenticated digest; and
the first electronic device validating the authenticated digest based on the checking of the nonce and the checking of the signature.

8. A non-transitory machine-readable storage medium associated with a verifier, wherein the storage medium to store instructions that, when executed by the machine, cause the machine to:
challenge a first electronic device of a plurality of electronic devices of a network;
in response to the challenge of the first electronic device:
receive, from the first electronic device, first data signed by a security component of the first electronic device and representing content stored in the security component of the first electronic device; and
receive, from the first electronic device, second data signed by the security component of the first electronic device and representing an authenticated digest provided to the first electronic device by a second electronic device of the plurality of devices, wherein the authenticated digest represents content stored in a security component of the second electronic device and is signed by the security component of the second electronic device; and
evaluate a condition of the network based on the first and second data; and
in response to the challenge of the first electronic device, receive third data signed by the security component of the first electronic device and representing an authenticated digest provided to the first electronic device by a third device of the plurality of devices, wherein the authenticated digest represents content stored in a security component of the third device and is signed by the security component of the third device.

9. The storage medium of claim 8, wherein the authenticated digest is provided by the second electronic device in response to a challenge provided by the first electronic device to the second electronic device, and the instructions, when executed by the machine, further cause the machine to:
based on the second data, determine a first time corresponding to when the first electronic device provided the challenge to the second electronic device and a second time corresponding to when the second electronic device provided the authenticated digest in response to the challenge by the first electronic device.

10. The storage medium of claim 9, wherein the instructions, when executed by the machine, further cause the machine to accept or reject the authenticated digest provided by the second electronic device based on a difference of the first and second times.

11. The storage medium of claim 8, wherein the instructions, when executed by the machine, further cause the machine to determine that an event affected the second electronic device based on the authenticated digest indicating that platform configuration registers of the second electronic device were reset.

12. The storage medium of claim 8, wherein the authenticated digest provided by the second electronic device security component of the second electronic device comprises data representing platform configuration registers of the second electronic device.

* * * * *